United States Patent Office 2,815,453
Patented Dec. 3, 1957

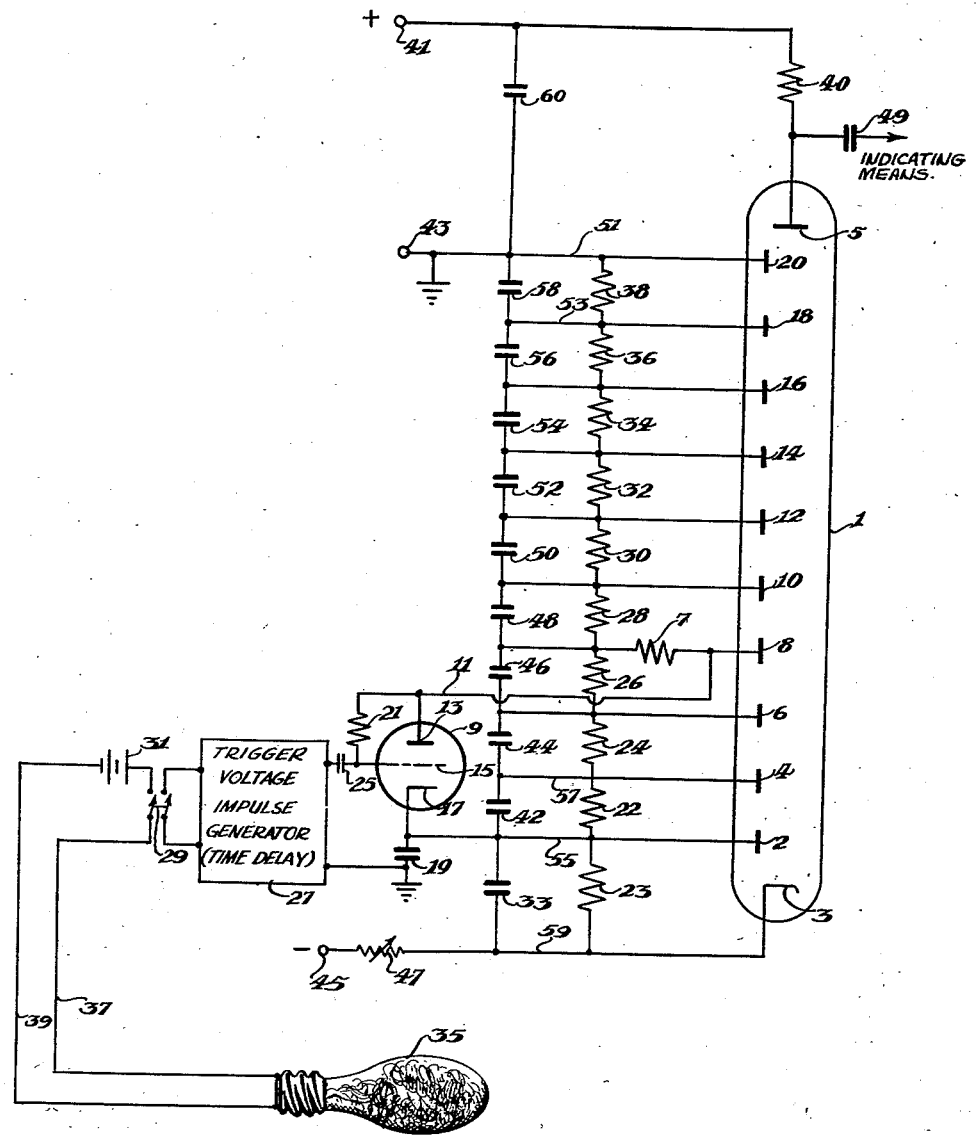

2,815,453

RADIATION-INDICATING METHOD AND SYSTEM

Edward A. Colson, Amherst, N. H., and Lewis Fussell, Jr., Concord, Mass., assignors to Edgerton, Germeshausen and Grier, Inc., Boston, Mass., a corporation of Massachusetts Application January 9, 1953, Serial No. 330,552

14 Claims. (Cl. 250—207)

The present invention relates to methods of and systems for indicating the presence of radiation, and more particularly to methods of and systems for the detection of electromagnetic-wave and charged-particle radiation.

Among the most widely used radiation detectors is the photomultiplier tube embodying a photo-sensitive cathode electrode upon which radiation signals may impinge. Electrons released from the photo-sensitive cathode become successively multiplied in number or amplified at successively disposed points at which secondary electron-emissive electrodes, known as dynodes, are disposed, finally impinging upon a collector anode electrode. In order to operate the photomultiplier tube, permanent operating voltages are impressed between each two adjacently disposed electrodes to accelerate the flow of electrons from the cathode to each successive secondary electron-emissive electrode, and finally to the anode. The secondary electron-emitting surfaces of the dynodes, however, are subject to a fatigue effect resulting from an inherent decay with time and current in electron-emission sensitivity of the dynode surfaces. Transient radiation phenomena that it may be desired to record, therefore, can be detected by such tubes with but little sensitivity in view of the normal fatigued condition of the tube. Since, moreover, as before indicated, the decay in sensitivity of the electron-emissive surfaces is a function of the time of use of the tube, the actual sensitivity of the photomultiplier tube is not known at any arbitrary time at which a measurement of a transient phenomenon is to take place, and hence accurate measurements can not be made. The same disadvantages are evident, furthermore, when it is desired to inspect or measure steady-state radiation conditions for but a short interval of time.

An object of the present invention is to provide a new and improved method of and system for radiation detection or measurement that shall not be subject to the above-mentioned disadvantages and that, on the contrary, shall permit radiation detection over any desired predetermined time interval with full and determinable sensitivity.

While the sudden application of all of the photo-multiplier tube electrode-operating voltages for a momentary predetermined time interval, during which a radiation measurement may be effected, might appear to be a solution to this problem, the difficulties attendant upon the attempt to apply and remove high voltages with rapidity render such a proposal impractical. It is preferable, on the contrary, to control the tube with low voltages.

A further object of the present invention, therefore, is to provide the desired ends with a low-voltage control of the radiation detector. In accordance with the invention, the operating voltage of one of the low-voltage secondary electron-emissive electrodes is normally modified to render that electrode ineffective to emit secondary electrons, thereby normally to prevent electron current flow in the tube from the cathode beyond that electrode. A low-voltage trigger circuit restores the operating voltage to that electrode for the desired predetermined short time interval of radiation measurement. Preferred details are hereinafter set forth.

Other and further objects will be explained hereinafter and will be more particularly pointed out in the appended claims.

The invention will now be described in connection with the accompanying drawing the single figure of which is a schematic diagram of circuits and apparatus arranged and constructed in accordance with a preferred embodiment of the invention. A photomultiplier tube 1 is shown provided with a photo-sensitive cathode electrode 3, a collector anode electrode 5 and a plurality of successively disposed secondary electron-emissive dynode electrodes 2, 4, 6, 8, 10, 12, 14, 16, 18 and 20, spaced at successive points between the anode and cathode. While ten dynodes are shown, this is but for purposes of illustration, it being understood that more or less secondary electron-emissive electrodes may be utilized. High voltage is supplied between a positive terminal 41 and a negative terminal 45, an intermediate terminal 43 being shown grounded. Connected between the terminals 41 and 43 is a storage capacitor 60, and connected between the successive pairs of dynodes are similar capacitors, numbered by even numbers between 42 and 58. The capacitor 58, for example, is connected by conductors 51 and 53 between dynodes 20 and 18. The capacitor 42, as another illustration, is connected by conductors 55 and 57 between the dynodes 2 and 4. The other capacitors are similarly connected between adjacent dynodes. A further capacitor 33 is connected by conductors 55 and 59 between the dynode 2 adjacent the cathode 3, and the cathode 3.

Also connected between adjacent dynodes are resistors, numbered by even numbers between 22 and 38, of a voltage bleeder network supplying normal operating voltages to the dynodes. The bleeder resistor 38, for example, is connected by the conductors 51 and 53 between the dynodes 20 and 18, in parallel with the storage capacitor 58. Similarly, the other bleeder resistors interconnect adjacent dynodes. The resistor 22, as a further example, is connected by the conductors 55 and 57 between the dynodes 2 and 4, in parallel with capacitor 42. A bleeder resistor 23 is connected by the conductors 59 and 55 between the cathode 3 and the dynode 2, in parallel with capacitor 33. The anode 5 is connected to the high-voltage positive terminal 41 through a resistor 40. By this construction, each electrode from the cathode to the anode has a successively higher operating voltage applied thereto than the preceding electrode. As electrons leave the photo-sensitive cathode 3 in response to the impingement thereon of radiation, they become accelerated to the first dynode 2 and they are there multiplied in number or amplified by the emission of secondary electrons from the dynode 2. This secondary electron current is directed upon the dynode 4 and further amplified by the release of an even greater secondary electron current from the dynode 4, and so on; each successive dynode to which successively greater voltages are applied by the bleeder network, amplifying the electron current to a successively greater degree. Finally, the electrons emitted from the last dynode 20 are accelerated to the anode 5, and an output current indicative of the radiation upon the cathode 3 will be available at an output condenser 49. This output current may be fed to any desired recording, indicating measuring or control system, not shown.

Under such operation, as before pointed out, the secondary electron-emissive surfaces become fatigued, and the tube 1, not only loses sensitivity, but the sensitivity thereof at any particular time is unknown. In accordance with the present invention, however, the operating voltage impressed upon a predetermined one of the secondary electron-emissive electrodes is modified to a value below that required for the electrode to emit secondary electron current, so that current cannot proceed beyond this electrode in the tube. The predetermined electrode is shown as the fourth electrode 8, though this is only for illustrative purposes. It is desirable, however, that a low secondary-electron-emitting dynode be selected which does not suffer appreciable fatigue in normal operation in view of its low electron emission, such a dynode usually being closer to the cathode 3 than to the anode 5. The modification of the operating voltage impressed upon the predetermined dynode is preferably effected with the aid of a trigger circuit adapted normally to bias the dynode to render it ineffective to emit electrons and then, in response to a low-voltage trigger stimulus, to render the dynode effective for a predetermined short time interval, thus to permit electron emission therefrom and current flow to the anode without fatigue and with a known tube sensitivity. The trigger circuit may assume any of a variety of forms including switching devices of the mechanical, gaseous or electron-discharge types. For purposes of illustration, the trigger circuit is shown comprising a discharge tube 9 having an anode 13, a control electrode 15 and a cathode 17. The anode 13 is connected by a conductor 11 to the predetermined dynode 8, which, instead of being directly connected to the lower terminal of the bleeder resistor 28, is connected thereto through a voltage-dropping impedance such as the resistor 7. The cathode 17 is connected to the conductor 55 and hence to the junction of the bleeder resistors 22 and 23, so that anode voltage is supplied to the discharge tube 9 in the circuit traceable from the terminal 43, through the bleeder resistors 38, 36, 34, 32, 30 and 28, through the resistor 7 to the anode 13, and from the terminal 45 through a voltage-adjusting resistor 47 and bleeder resistor 23 to the cathode 17. The cathode 17 is coupled to ground, insofar as alternating current is concerned, through a capacitor 19.

The trigger tube 9 is normally conductive as a result of the positive voltage applied to its control electrode 15 through the resistor 21 that is connected between the control electrode 15 and the anode 13. The voltage at the dynode 8 is thus reduced below the required operating voltage, since the voltage at the anode 13 of the trigger tube 9, to which the dynode 8 is connected by the conductor 11, as before stated, becomes low when the tube 9 conducts. By applying a low-voltage triggering impulse between the control electrode 15 and the cathode 17 of polarity and magnitude proper to cut off or render non-conductive the tube 9, the anode 13 thereof will suddenly rise in voltage, raising the voltage on the dynode 8 to at least the necessary operating voltage and permitting the tube 1 to conduct beyond the dynode 8 and thus provide output current from the anode 5 indicative of radiation impinging upon the cathode 3 at that time. Discharge devices of the type illustrated at 9 can, of course, as is well known, be sharply cut-off and rendered conductive at any desired time and for any desired time interval so that the rendering effective of the tube 1 can be accurately timed and controlled, as described, for example, in United States Letters Patent 2,478,901, issued August 16, 1949, to Harold E. Edgerton.

While the source of triggering pulses may be of any well-known type, such as a pulse generator of the single or repetitive type, it may be desired to synchronize the production of a radiation signal with the rendering effective of the tube 1. As an illustration, a source of light radiation, such as a chemical flash lamp 35, may be operated by closing a switch 29 to pass current from a battery 31 through conductors 37 and 39 to the lamp 35. It may be desired to measure the intensity of the radiation produced by the lamp 35 at a predetermined time after the initiation of the radiation of the lamp. To this end, the closing of the switch 29 may also synchronously close a circuit of any well-known trigger voltage-pulse generator 27, preferably incorporating a time-delay device such as a resistor-condenser charging circuit, a one-shot multivator circuit, or any other time-constant-controlled system for producing a voltage impulse the desired predetermined time after the closing of the switch 29, including systems of the type disclosed in the said Letters Patent. This voltage impulse may be fed through capacitor 25 to the control grid 15 and through capacitor 19 to the cathode 17, momentarily to cut off or render non-conductive the tube 9, thus to render the dynode 8 effective and thus the tube 1 effective to detect the radiation of the lamp 35 for the duration of the voltage impulse. This duration may be controlled in any desired manner, as is well known, as by the momentary closing only of the switch 29, or the adjustment of the pulse width of the pulse produced by the trigger impulse generator, or as described in the said Letters Patent.

If it is desired that the tube 1 be rendered effective at the exact time of initiation of the radiation of the lamp 35, of course, no time delay is necessary, the switch 29 merely effecting the placing of a trigger bias-voltage upon the control electrode 15 directly for the desired time interval. The lamp 35, moreover, is only an illustration of a source of radiation, it being understood that other sources of electromagnetic, charged-particle or other radiation may similarly be operated or used. Other well-known types of bias applying and removing trigger circuits may also be employed such as thyratron-type trigger circuits, blocking oscillators and the like.

Further modifications will occur to those skilled in the art and all such are considered to fall within the spirit and scope of the present invention as defined in the appended claims.

What is claimed is:

1. A method of indicating the presence of radiation upon the first of a plurality of successively disposed electrodes at which, except for the first and last electrodes, electrons may be produced in response to electrons arriving at each of the said electrodes from the next previously positioned electrode, the said method comprising applying a high voltage between the first and last electrodes, applying a biasing potential for normally preventing the production of electrons at a predetermined one of the said electrodes between the first and last electrodes during the application of the said high voltage, thereby normally to prevent electrons from traveling beyond the said predetermined electrode, producing electrons at the first electrode in response to radiation and directing the same toward the next electrode, and applying to said predetermined electrode a voltage pulse overcoming the biasing potential for momentarily permitting the production of electrons at the said predetermined electrode in order to permit electrons to travel therebeyond to the last electrode, thereby to indicate at the last electrode the radiation upon the first electrode.

2. In an electric system comprising a photo-multiplier tube having a plurality of electrodes, namely, a radiation-sensitive electron-emissive cathode, an anode and a plurality of secondary electron-emissive electrodes spaced between the anode and the cathode, and in which operating voltages may be impressed between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, a method of momentarily indicating the impingment of radiation upon the cathode that comprises applying a biasing potential to a predetermined secondary electron-emissive electrode to render the same normally ineffective to emit secondary electrons during the impressing of the operating voltage between the anode and the cathode, thereby normally to prevent electron current flow in the tube from the cathode beyond the predetermined secondary electron-emissive electrode, and applying a voltage impulse to the predetermined secondary electron-emissive electrode to overcome the biasing potential and render the predetermined electrode momentarily effective to emit secondary electrons in order to establish current flow in the tube from the cathode to the anode, thereby to indicate radiation upon the cathode.

3. In an electric system comprising a photo-multiplier tube having a plurality of electrodes, namely, a radiation-sensitive electron-emissive cathode, an anode and a plurality of secondary electron-emissive electrodes spaced between the anode and the cathode, and in which operating voltages may be impressed between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, a method of momentarily indicating the impingement of radiation upon the cathode that comprises applying a biasing potential to a predetermined secondary electron-emissive electrode to render the same normally ineffective to emit secondary electrons during the impressing of the operating voltage between the anode and the cathode, thereby normally to prevent electron current flow in the tube from the cathode beyond the predetermined secondary electron-emissive electrode, initiating the production of radiation, and synchronously with the radiation production applying a voltage impulse to the predetermined secondary electron-emissive electrode to overcome the biasing potential and render the predetermined electrode momentarily effective to emit secondary electrons in order to establish current flow in the tube from the cathode to the anode, thereby to indicate radiation upon the cathode.

4. An electric system for indicating the presence of radiation over a predetermined short time interval only having, in combination, a photomultiplier tube provided with a radiation-sensitive electron-emissive cathode electrode, an anode electrode and a plurality of secondary electron-emissive electrodes successively disposed between the anode and the cathode, means for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, means operable without changing the anode-to-cathode operating voltage for modifying the operating voltage at a predetermined secondary electron-emissive electrode to render the same ineffective to emit secondary electrons, thereby normally to prevent electron current flow in the tube from the cathode beyond the predetermined secondary electron-emissive electrode, and a trigger device for restoring the operating voltage to the said predetermined secondary electron-emissive electrode for the said predetermined short time interval only in order to render the same momentarily effective to emit secondary electrons, thereby to establish current flow in the tube from the cathode to the anode indicative of radiation upon the cathode during the said short time interval.

5. An electrode system for indicating the presence of radiation over a predetermined short time interval only having, in combination, a photomultiplier tube provided with a radiation-sensitive electron-emissive cathode electrode, an anode and a plurality of secondary electron-emissive electrodes successively disposed between the cathode and the anode, means for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, means operable without changing the anode-to-cathode operating voltage for modifying the operating voltage at a predetermined secondary electron-emissive electrode that, during the flow of current in the tube, emits insufficient secondary electron current to become appreciably fatigued, to render the same ineffective to emit secondary electrons, thereby normally to prevent electron current flow in the tube from the cathode beyond the predetermined secondary electron-emissive electrode, and a trigger device for restoring the operating voltage to the said predetermined secondary electron-emissive electrode for the said predetermined short time interval only in order to render the same momentarily effective to emit secondary electrons, thereby to establish current flow in the tube from the cathode to the anode indicative of radiation upon the cathode during the said short time interval.

6. An electric system for indicating the presence of radiation over a predetermined short time interval only having, in combination, a photomultiplier tube provided with a radiation-sensitive electron-emissive cathode electrode, an anode electrode and a plurality of secondary electron-emissive electrodes successively disposed between the cathode and the anode, means for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, means operable without changing the anode-to-cathode operating voltage for modifying the operating voltage at a predetermined secondary electron-emissive electrode closer to the cathode than the anode to render the same ineffective to emit secondary electrons, thereby normally to prevent electron current flow in the tube from the cathode beyond the predetermined secondary electron-emissive electrode, and a trigger device for restoring the operating voltage to the said predetermined secondary electron-emissive electrode for the said predetermined short time interval only in order to render the same momentarily effective to emit secondary electrons, thereby to establish current flow in the tube from the cathode to the anode indicative of radiation upon the cathode during the said short time interval.

7. An electric system for indicating the presence of radiation over a predetermined short time interval only having, in combination, a photomultiplier tube provided with a radiation-sensitive electron-emissive cathode electrode, an anode electrode and a plurality of secondary electron-emissive electrodes successively disposed between the cathode and the anode, means for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, means for modifying the operating voltage at a predetermined secondary electron-emissive electrode to render the same ineffective to emit secondary electrons, thereby normally to prevent electron current flow in the tube from the cathode beyond the predetermined secondary electron-emissive electrode, means for initiating the production of radiation and a trigger device controlled by the initiating means for momentarily restoring the operating voltage to the said predetermined secondary electron-emissive electrode for the said predetermined short time interval only in order to render the same momentarily effective to emit secondary electrons, thereby to establish current flow in the tube from the cathode to the anode indicative of the radiation upon the cathode during the said short time interval.

8. An electric system for indicating the presence of radiation over a predetermined short time interval only having, in combination, a photomultiplier tube provided with a radiation-sensitive electron-emissive cathode electrode, an anode electrode and a plurality of secondary electron-emissive electrodes successively disposed between the cathode and the anode, means for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, means for modifying the operating voltage at a predetermined secondary electron-emissive electrode to render the same ineffective to emit secondary electrons, thereby normally to prevent electron current flow in the tube from the cathode beyond the predetermined secondary electron-emissive electrode, means for initiating the production of radiation, means for producing an electrical impulse delayed from the instant of initiation of the production of radiation, and a trigger device connected to the delayed impulse-producing means and controlled thereby for momentarily restoring the operating voltage to the said predetermined secondary electron-emissive electrode for the said predetermined short time interval only in order to render the same momentarily effective to emit secondary electrons, thereby to establish current flow in the tube from the cathode to the anode indicative of the radiation upon the cathode during the said short time interval.

9. An electric system for indicating the presence of radiation over a predetermined short time interval having, in combination, a photomultiplier tube provided with a radiation-sensitive electron-emissive cathode electrode, an anode electrode and a plurality of secondary electron-emissive electrodes successively disposed between the cathode and the anode, a bleeder network for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, a voltage-dropping impedance connected between the bleeder network and a predetermined secondary electron-emissive electrode, a discharge device having an anode, a control electrode and a cathode, means for connecting the discharge-device anode to the said predetermined secondary electron-emissive electrode in order that it may receive anode voltage through the voltage-dropping impedance and the bleeder network, means for positively biasing the discharge-device control electrode with respect to its cathode to render the discharge device normally conductive in order to reduce the value of the voltage impressed upon the said predetermined secondary electron-emissive electrode below the operating voltage required to permit the emission therefrom of secondary electron current, thereby normally to prevent electron current flow in the tube from the cathode beyond the predetermined secondary electron-emissive electrode, and means for applying a voltage impulse of duration corresponding to the said predetermined short time interval between the discharge-device control electrode and cathode in order to render the discharge device momentarily non-conductive, thereby raising the voltage at the discharge-device anode and correspondingly restoring the necessary operating voltage to the said predetermined secondary electron-emissive electrode to permit current to flow in the tube from the cathode to the anode indicative of the radiation upon the cathode during the said short time interval.

10. An electric system for indicating the presence of radiation upon the first of a plurality of successively disposed electrodes at which, except for the first and last electrodes, electrons may be produced in response to electrons arriving at each of the said electrodes from the next previously positioned electrode, the said apparatus comprising means for applying a high voltage between the first and last electrodes, means operable during the continued application of the said high voltage for normally preventing the production of electrons at a predetermined one of the said electrodes between the first and last electrodes, thereby normally to prevent electrons from traveling beyond the said predetermined electrode, means for producing electrons at the first electrode in response to radiation and directing the same toward the next electrode, and means for momentarily permitting the production of electrons at the said predetermined electrode in order to permit electrons to travel therebeyond to the last electrode, thereby to indicate at the last electrode the radiation upon the first electrode.

11. An electric system comprising a photomultiplier tube having a plurality of electrodes, namely, a radiation-sensitive electron-emissive cathode, an anode and a plurality of secondary electron-emissive electrodes spaced between the anode and the cathode, means for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, means operable without changing the voltage impressed upon the cathode for rendering a predetermined secondary electron-emissive electrode normally ineffective to emit secondary electrons, thereby normally to prevent electron current flow in the tube from the cathode beyond the predetermined secondary electron-emissive electrode, and means for rendering the predetermined secondary electron-emissive electrode momentarily effective to emit secondary electrons in order to establish current flow in the tube from the cathode to the anode.

12. An electric system comprising a photomultiplier tube having a plurality of electrodes, namely, a radiation-sensitive electron-emissive cathode, an anode and a plurality of secondary electron-emissive electrodes spaced between the anode and the cathode, means for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, means for rendering a single predetermined secondary electron-emissive electrode only normally ineffective to emit secondary electrons, thereby normally to prevent electron current flow in the tube from the cathode beyond the predetermined secondary electron-emissive electrode, and means for rendering the predetermined secondary electron-emissive electrode momentarily effective to emit secondary electrons in order to establish current flow in the tube from the cathode to the anode.

13. An electric system for indicating the presence of radiation over a predetermined short time interval only having, in combination, a photomultiplier tube provided with a radiation-sensitive electron-emissive cathode electrode, an anode electrode and a plurality of secondary electron-emissive electrodes successively disposed between the anode and the cathode, means for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, means for modifying the operating voltage at a single predetermined secondary electron-emissive electrode only to render the same ineffective to emit secondary electrons, thereby normally to prevent electron current flow in the tube from the cathode beyond the predetermined secondary electron-emissive electrode, and a trigger device for restoring the operating voltage to the said predetermined secondary electron-emissive electrode for the said predetermined short time interval only in order to render the same momentarily effective to emit secondary electrons, thereby to establish current flow in the tube from the cathode to the anode indicative of radiation upon the cathode during the said short time interval.

14. An electric system for indicating the presence of radiation over a predetermined short time interval only having, in combination, a photomultiplier tube provided with a radiation-sensitive electron-emissive cathode electrode, an anode electrode and a plurality of secondary electron-emissive electrodes successively disposed between the cathode and the anode, means for impressing operating voltages between each two adjacently disposed electrodes to permit electron current to flow in the tube from the cathode in response to radiation impinged thereon to the secondary electron-emissive electrode disposed adjacent to the cathode, from each secondary electron-emissive electrode to the next adjacent secondary electron-emissive electrode and to the anode from the secondary electron-emissive electrode adjacent thereto, means for modifying the operating voltage at a single predetermined secondary electron-emissive electrode only and closer to the cathode than the anode that, during the flow of current in the tube, emits insufficient secondary electron current to become appreciably fatigued, to render the same ineffective to emit secondary electrons, thereby normally to prevent electron current flow in the tube from the cathode beyond the predetermined secondary electron-emissive electrode, and a trigger device for restoring the operating voltage to the said predetermined secondary electron-emissive electrode for the said predetermined short time interval only in order to render the same momentarily effective to emit secondary electrons, thereby to establish current flow in the tube from the cathode to the anode indicative of radiation upon the cathode during the said short time interval.

References Cited in the file of this patent
UNITED STATES PATENTS

| | | |
|---|---|---|
| 2,583,143 | Glick | Jan. 22, 1952 |
| 2,594,703 | Wouters | Apr. 29, 1952 |